United States Patent
Hughes

Patent Number: 6,134,427
Date of Patent: Oct. 17, 2000

[54] USING A SINGLE LOW-NOISE AMPLIFIER IN A MULTI-BAND WIRELESS STATION

[75] Inventor: Simon A. Hughes, Costa Mesa, Calif.

[73] Assignee: Conexant Systems, Inc., Newport Beach, Calif.

[21] Appl. No.: 09/164,168

[22] Filed: Sep. 30, 1998

[51] Int. Cl.$^7$ ........................................ H04B 1/06
[52] U.S. Cl. .................. 455/269; 455/189.1; 455/193.2; 455/553; 330/126; 330/129
[58] Field of Search .................... 455/269, 454, 455/188.1, 189.1, 193.2, 341, 296

[56] References Cited

U.S. PATENT DOCUMENTS

| | | |
|---|---|---|
| 5,291,516 | 3/1994 | Dixon et al. . |
| 5,438,684 | 8/1995 | Schwent et al. . |
| 5,448,255 | 9/1995 | Hulett et al. . |
| 5,457,734 | 10/1995 | Eryaman et al. . |
| 5,663,957 | 9/1997 | Dent . |
| 5,668,837 | 9/1997 | Dent . |
| 5,729,538 | 3/1998 | Dent ........................................ 370/347 |
| 5,774,017 | 6/1998 | Adar ........................................ 330/51 |
| 5,787,076 | 7/1998 | Anderson . |
| 5,915,223 | 6/1999 | Lecuyer et al. ........................ 455/552 |
| 5,926,751 | 7/1999 | Vlahos et al. ......................... 455/280 |
| 5,960,354 | 9/1999 | Einola ................................... 455/454 |
| 5,977,928 | 11/1999 | Ying et al. ............................. 343/790 |

*Primary Examiner*—Thanh Cong Le
*Assistant Examiner*—Thuan T. Nguyen
*Attorney, Agent, or Firm*—Fish & Richardson P.C.

[57] ABSTRACT

A wireless communication device, such as a dual-mode cellular phone, receives radio frequency (RF) signals in either of two communication bands. Each received RF signal is passed to two bandpass filters, one for each communication band, the outputs of which are connected to a single amplifier. The amplifier processes the received signal regardless of the communication band in which the signal was received. The amplifier can include two sets of similar circuitry, e.g., matching circuits, one for each communication band, which are selected alternatively to process received signals in the corresponding communication band.

22 Claims, 4 Drawing Sheets

USING A SINGLE LOW-NOISE AMPLIFIER IN A MULTI-BAND WIRELESS STATION

TECHNICAL FIELD

The invention relates to wireless communication and, more particularly, to the use of a single low-noise amplifier in a multi-band wireless station.

BACKGROUND

In a multi-band wireless communication network, wireless stations communicate by sending signals to each other in multiple, preassigned communication frequency bands. Each station in the network must be able to receive and process signals in each of these frequency bands. For example, in a GSM/DCS dual-mode system, each station must process radio frequency (RF) signals in both the Global System for Mobile (GSM) and the Digital Communication Service (DCS) bands. In general, much of the circuitry in a multi-mode wireless station is replicated once for each communication band in which the station must communicate.

FIG. 1 is a simplified schematic diagram of a typical GSM/DCS dual-mode wireless phone 10. The phone 10 includes a transmitter 12 and a receiver 14 that send and receive signals, respectively, through a wireless network via an antenna 16 and an antenna interface circuit 18. The receiver 14 includes two front-end filtering circuits coupled to the antenna interface circuit 18: a GSM circuit, which processes only those signals transmitted in the GSM band; and a DCS circuit, which processes only those signals transmitted in the DCS band. The GSM and DCS front-end receiver circuits are virtually identical in structure, with the GSM circuit including a GSM-band surface acoustic wave (SAW) filter 20, a low-noise amplifier 22, and a GSM-band image-reject filter 24 arranged in series; and with the DCS circuit including a DCS-band SAW filter 26, a low-noise amplifier 28, and DCS-band image reject filter 30 arranged in series. The image reject filters 24, 30 remove unwanted shadow, or "image," signals received at frequencies other than the GSM and DCS carrier frequencies. A switch 32 applies the output signal from one of the front-end receiver circuits, via a power amplifier 34, to a double side band (DSB) mixer 36. The double side band mixer 36 mixes the signal from the front-end receiver circuits with an amplified signal from a voltage controlled oscillator (VCO) 38 and delivers the resulting intermediate frequency (IF) signals to subsequent circuitry for processing and demodulation.

FIG. 2 shows a typical structure for both the GSM-band and the DCS-band low-noise amplifiers 22, 28 (FIG. 1). Each amplifier includes a transistor-based linear amplifier 40 coupled to two matching circuits: an input matching circuit 42 that receives a GSM-band or DCS-band signal from one of the SAW filters 20, 26 (FIG. 1) and provides the signal as input to the linear amplifier 40; and an output matching circuit 44 that receives the amplified signal from the linear amplifier 40 and delivers it to one of the image reject filters 24, 30 (FIG. 1). Because a conventional multi-mode wireless phone includes a low-noise amplifier for each communication band, the conventional phone includes multiple copies of each of the components shown in FIG. 2.

SUMMARY

The invention was developed, in part, to provide a common signal processing path for all signals received by a multi-band wireless station and to reduce the number of components required in the signal processing circuitry. The invention features the reception of radio frequency (RF) signals in either of two communication bands in a wireless communication system, such as a dual-mode cellular phone. Each received RF signal is passed to two bandpass filters, one for each communication band, the outputs of which are connected to a single amplifier, which amplifies the signal regardless of the communication band in which the signal was received.

In some implementations, the amplifier includes two sets of circuitry having similar structure, each corresponding to one of the frequency bands. The appropriate set of circuity is selected when the received signal lies in the corresponding band. A signal processing characteristic of the amplifier, such as the resonant frequency of a matching circuit, may vary depending upon which set of circuitry is selected. The matching circuit can include, e.g., an L-C circuit, one element of which can be removed selectively to alter the circuit's resonant frequency.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference numbers and designations in the various drawings indicate like elements.

DETAILED DESCRIPTION

Figure 1:
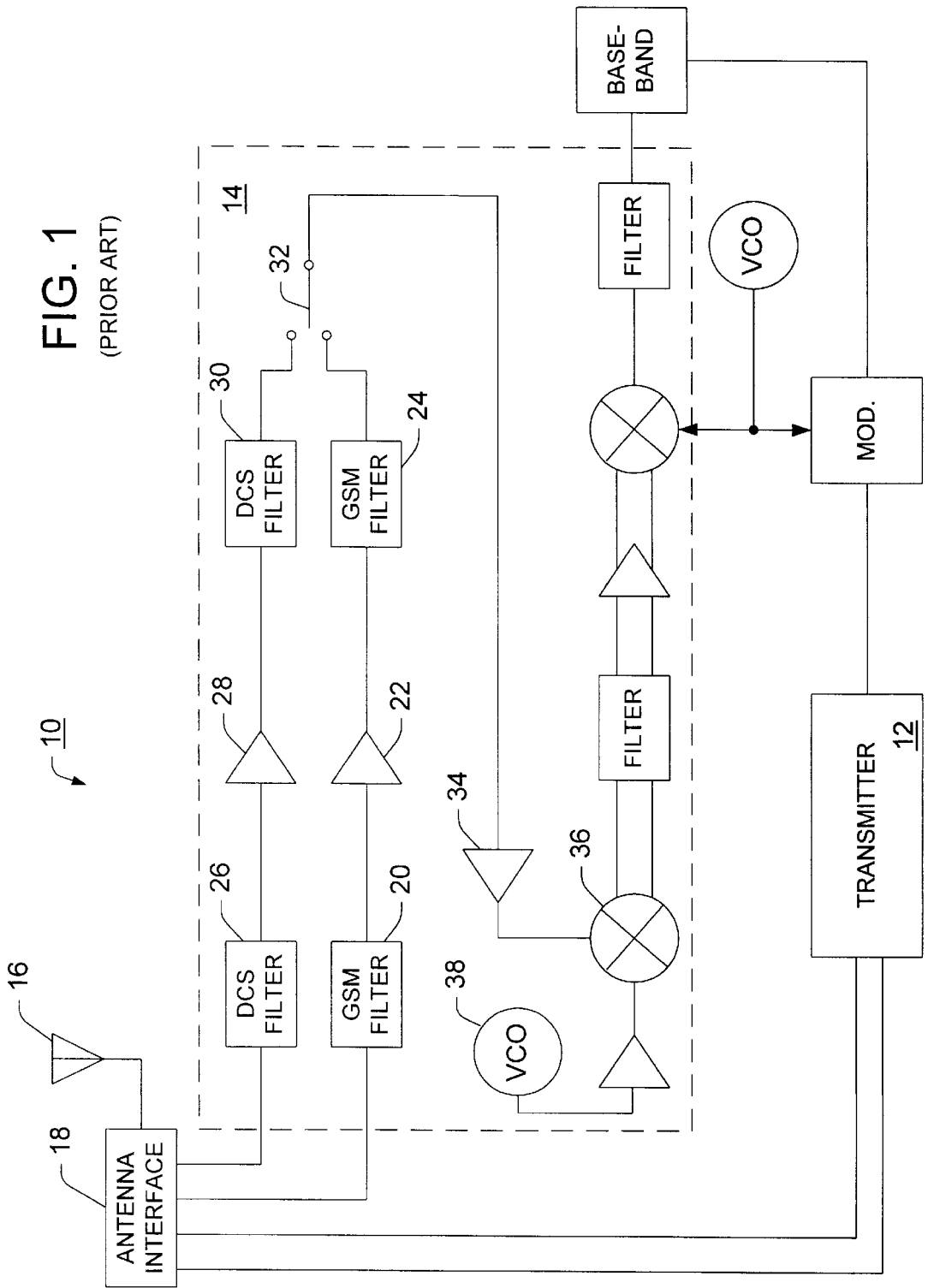
FIG. 1 is a schematic diagram of a conventional dual-mode wireless station.
Figure 2:
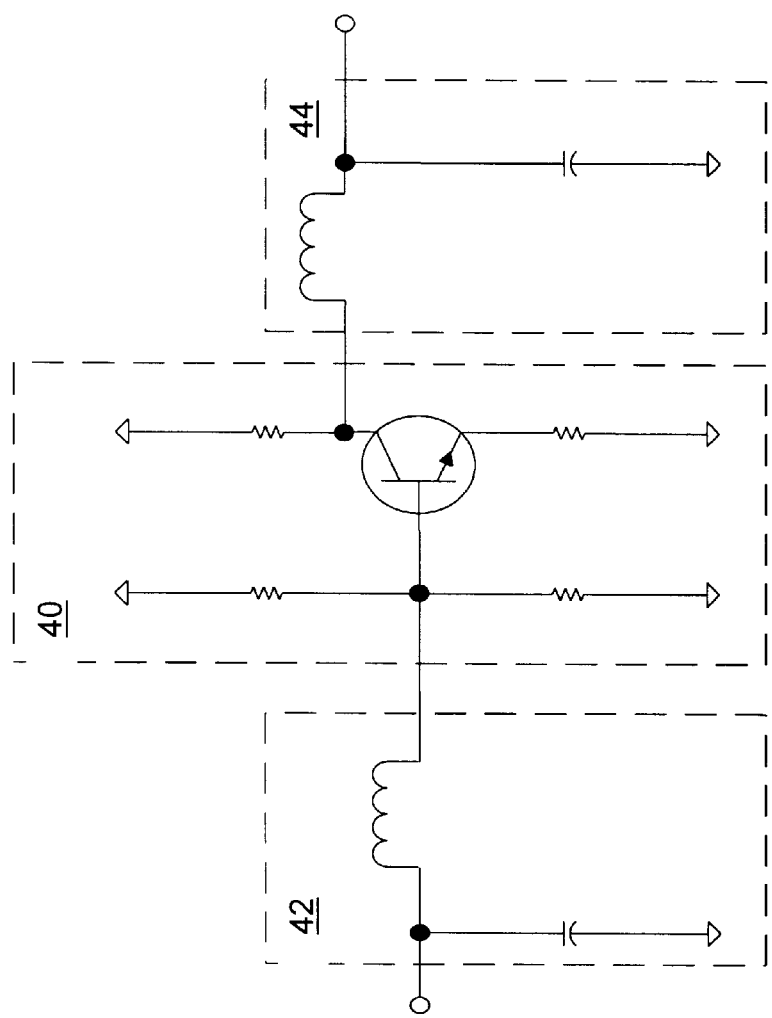
FIG. 2 is a schematic diagram of a low-noise amplifier used in the conventional dual-mode station of FIG. 1.
Figure 3:
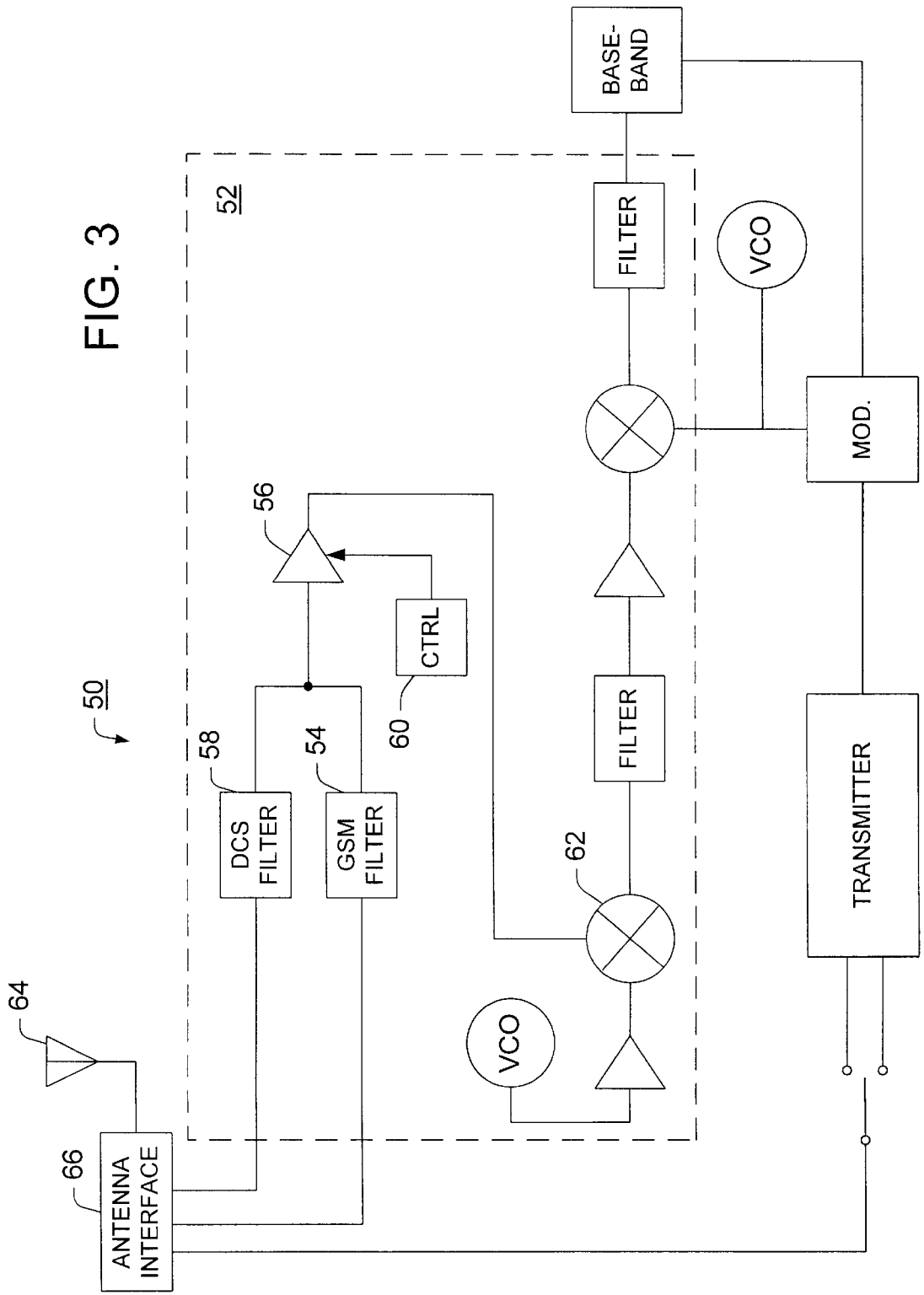
FIG. 3 is a schematic diagram of a dual-mode wireless station having a single low-noise amplifier for use in processing signals in both communication bands.

FIG. 3 is a simplified schematic diagram of a GSM/DCS dual-mode wireless station 50 having a single low-noise amplifier 56 for use in processing signals in both the GSM and DCS communication bands. Unlike the wireless station shown in FIG. 1, this wireless station 50 does not include separate low-noise amplifiers for the GSM and DCS communication bands. Moreover, the wireless station may include a single side band (SSB) image reject mixer 62 instead of a dual side band mixer, which eliminates the need for image reject mixers in the signal processing path. Use of a SSB image reject mixer is described in U.S. patent application 09/163,712 filed on Sep. 30, 1998, by Simon A. Hughes, John R. Rowland, Jr.,and Emmanuel Ngompe and entitled "Using a Single Side Band Mixer to Reject Image Signals In a Wireless Station," which is incorporated by reference.

The mobile station includes a GSM-band filter 54 and a DCS-band filter 58, both of which may be surface acoustic wave (SAW) filters, which receive incoming signals from an antenna 64 via an antenna interface 66. The bandwidth of the GSM-band filter 54 is approximately 935 to 960 MHZ, and the bandwidth of the DCS-band filter 58 is approximately 1805 MHZ to 1880 MHZ.

The GSM-band and DCS-band filters 54, 58 both connect to the low-noise amplifier circuit 56, which amplifies the incoming signals and provides them to the SSB mixer 62. A controller 60 provides a control signal to the low-noise amplifier circuit 56 to configure the amplifier 60 for operation in the appropriate communication band, as described below. The mobile station 50 also may include a high pass filter circuit before the DCS-band filter 58, as described in the U.S. application incorporated by reference above.

Figure 4:
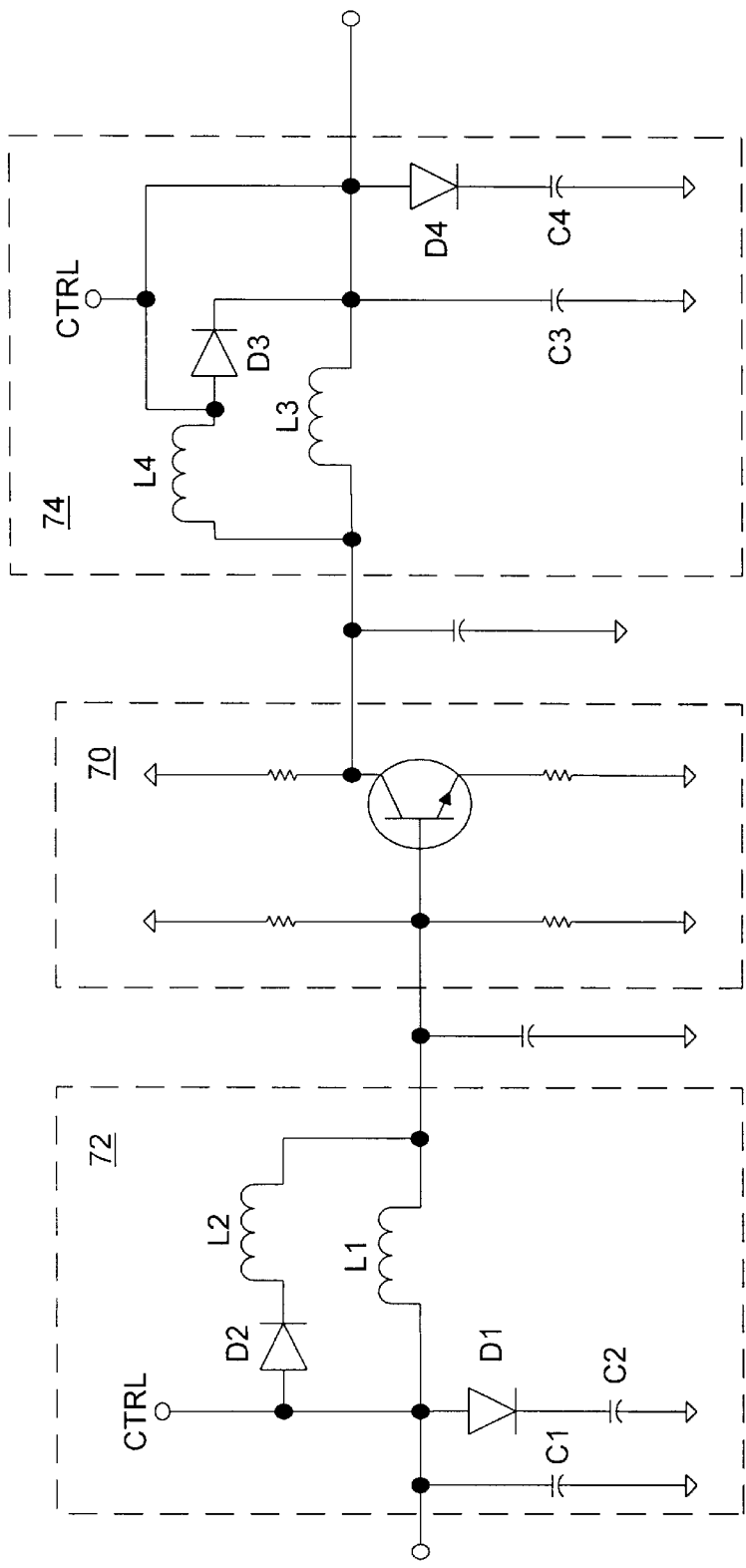
FIG. 4 is a schematic diagram of a low-noise amplifier for use in the wireless station of FIG. 3.

FIG. 4 shows the structure of the low-noise linear amplifier 56. The amplifier includes a transistor-based linear amplifier 70 coupled to a variable input matching circuit 72 and a variable output matching circuit 74. The input matching circuit 72 is an L-C circuit that includes two inductors L1, L2 arranged in parallel and two capacitors C1, C2 arranged in parallel. A diode D1 is connected in series with one of the inductors L2, and another diode D2 is connected in series with one of the capacitors C2. The diodes D1, D2 serve to vary the resonant frequency of the input matching circuit 72 by selectively removing the series-connected inductor L2 and capacitor C2 from the circuit, under the control of a signal CTRL generated by the controller 60 (FIG. 3). In particular, the diodes D1, D2 do not conduct, and therefore the inductor L2 and the capacitor C2 are removed from the input matching circuit 72, when the controller holds the control signal CTRL to a low value. In this situation, one inductor L1 and one capacitor C1 are used to provide the resonant frequency that is appropriate for communication in one of the frequency bands, e.g., the GSM band. When the mobile station 50 must communicate in the other communication band, e.g., the DCS band, the controller asserts the control signal CTRL, which causes the diodes D1, D2 to conduct and therefore varies the resonant frequency of the input matching circuit 72.

Like the input matching circuit 72, the output matching circuit 74 also includes two inductors L3, L4 arranged in parallel and two capacitors C3, C4 arranged in parallel, as well as two diodes D3, D4 that selectively remove one inductor L4 and one capacitor C4 from the circuit. The controller varies the resonant frequency of the output matching circuit 74 by asserting and deasserting the control signal CTRL, as described above.

A number of embodiments of the present invention have been described. Nevertheless, it will be understood that various modifications may be made without departing from the spirit and scope of the invention. For example, while the invention has been described in terms of a dual-mode wireless station, the invention is suitable for communication in any number of frequency bands. Also, switching devices other than diodes may be used to configure the low-noise amplifier for operation in the various bands. Accordingly, other embodiments are within the scope of the following claims.

What is claimed is:

1. A wireless communication device comprising:
   (a) circuitry configured to receive a radio frequency (RF) signal having a component lying in one of two communication frequency bands,
   (b) two filtering circuits, each configured to receive the signal and remove components lying outside of one of the two communication frequency bands, and
   (c) a signal amplifier connected to both of the filtering circuits and comprising a matching circuit adapted to provide a resonant frequency corresponding to one of the two communication frequency bands, said signal amplifier configured to amplify the filtered signal for subsequent processing.

2. The device of claim 1, wherein the signal amplifier includes circuitry that is active only when the signal has a component lying in a specific one of the communication bands.

3. The device of claim 1, wherein the signal amplifier has an associated signal processing characteristic that may be selected to have either of two alternative values, each corresponding to one of the communication frequency bands.

4. The device of claim 3, wherein the signal processing characteristic comprises resonant frequency of the matching circuit.

5. The device of claim 1, wherein the signal amplifier includes a transistor-based amplifier circuit coupled to at least one matching circuit.

6. The device of claim 5, wherein the matching circuit includes a component that can be removed from the circuit selectively when the received signal has a component lying in a specific one of the communication frequency bands.

7. The device of claim 6, wherein the matching circuit includes a switching element configured to selectively remove the component from the circuit.

8. The device of claim 7, wherein the switching element comprises a diode.

9. The device of claim 5, wherein the matching circuit includes an L-C circuit.

10. The device of claim 9, wherein the L-C circuit includes an inductor that can be removed from the circuit selectively when the received signal has a component lying in a specific one of the communication frequency bands.

11. The device of claim 9, wherein the L-C circuit includes a capacitor that can be removed from the circuit selectively when the received signal has a component lying in a specific one of the communication frequency bands.

12. A method for use in wireless communication comprising:
   (a) receiving radio frequency (RF) signals, each having a component lying in one of two communication frequency bands,
   (b) providing the signals to two filtering circuits, each configured to remove signal components lying outside of one of the two communication frequency bands,
   (c) delivering the filtered signals from both filtering circuits to a common signal amplifier configured to amplify the signals for subsequent processing, and
   (d) providing a resonant frequency corresponding to one of the two communication frequency bands.

13. The method of claim 12, further comprising activating a portion of the signal amplifier only when the signal has a component lying in a specific one of the communication bands.

14. The method of claim 12, further comprising selecting one of two alternative values for a signal characteristic of the signal amplifier, each value corresponding to one of the communication frequency bands.

15. The method of claim 14, wherein the signal processing characteristic comprises resonant frequency of a matching circuit.

16. The method of claim 12, wherein the signal amplifier includes a transistor-based amplifier circuit coupled to at least one matching circuit.

17. The method of claim 16, further comprising selectively removing a component from the matching circuit when the received signal has a component lying in a specific one of the communication frequency bands.

18. The method of claim 17, further comprising activating a switching element to selectively remove the component from the circuit.

19. The method of claim 18, wherein the switching element comprises a diode.

20. The method of claim 16, wherein the matching circuit includes an L-C circuit.

21. The method of claim 20, further comprising selectively removing an inductor from the L-C circuit when the received signal has a component lying in a specific one of the communication frequency bands.

22. The method of claim 20, further comprising selectively removing a capacitor from the L-C circuit when the received signal has a component lying in a specific one of the communication frequency bands.

* * * * *